(12) United States Patent
Chu et al.

(10) Patent No.: US 10,453,007 B2
(45) Date of Patent: Oct. 22, 2019

(54) AUTOMATIC TIME SERIES EXPLORATION FOR BUSINESS INTELLIGENCE ANALYTICS

(71) Applicant: International Business Machines Corporation, Armonk, NY (US)

(72) Inventors: Yea Jane Chu, Chicago, IL (US); Sier Han, Xi'an (CN); Jing-Yun Shyr, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 14/715,378

(22) Filed: May 18, 2015

(65) Prior Publication Data
US 2016/0342909 A1 Nov. 24, 2016

(51) Int. Cl.
G06Q 10/06 (2012.01)
G06T 11/20 (2006.01)

(52) U.S. Cl.
CPC .......... *G06Q 10/063* (2013.01); *G06T 11/206* (2013.01)

(58) Field of Classification Search
USPC ........................................................ 705/7.11
See application file for complete search history.

(56) References Cited

U.S. PATENT DOCUMENTS

| | | | |
|---|---|---|---|
| 6,901,383 B1 * | 5/2005 | Ricketts ................. | G06Q 40/04 705/36 R |
| 7,464,060 B2 | 12/2008 | Suyama et al. | |
| 7,783,510 B1 * | 8/2010 | Gilgur ................... | G06Q 10/00 705/7.25 |
| 7,818,224 B2 | 10/2010 | Boerner | |
| 7,865,389 B2 | 1/2011 | Shan | |
| 7,987,106 B1 | 7/2011 | Aykin | |
| 8,073,729 B2 * | 12/2011 | Kisin .................... | G06Q 10/04 705/7.35 |
| 8,296,108 B2 | 10/2012 | Tanaka | |

(Continued)

OTHER PUBLICATIONS

Jeon, Seungwoo & Hong, Bonghee & Kim, Byungsoo. Big Data Processing for Prediction of Traffic Time based on Vertical Data Arrangement. (Year: 2014).*

(Continued)

*Primary Examiner* — Renae Feacher
*Assistant Examiner* — Hector Leal
(74) *Attorney, Agent, or Firm* — Shumaker & Sieffert, P.A.

(57) ABSTRACT

Techniques are described for generating characterizations of time series data. In one example, a method includes extracting a trend-cycle component, a seasonal component, and an irregular component from a time series of data. The method further includes performing one or more pattern analyzes on the trend-cycle component, the seasonal component, and the irregular component. The method further includes, for each pattern analysis of the one or more pattern analyzes, performing a comparison of an analytic result of the respective pattern analysis to a selected significance threshold for the respective pattern analysis to determine if the analytic result passes the significance threshold for the respective pattern analysis. The method further includes generating an output for each of the analytic results that pass the significance threshold for the respective pattern analysis.

10 Claims, 11 Drawing Sheets

(56) References Cited

U.S. PATENT DOCUMENTS

| | | | | |
|---|---|---|---|---|
| 8,458,065 | B1* | 6/2013 | Zhang | G06Q 40/04 705/35 |
| 8,676,964 | B2 | 3/2014 | Gopalan et al. | |
| 2004/0220771 | A1* | 11/2004 | Breiman | G06Q 10/06 702/181 |
| 2006/0025931 | A1* | 2/2006 | Rosen | G16H 50/20 702/19 |
| 2007/0239753 | A1* | 10/2007 | Leonard | G06Q 30/02 |
| 2008/0222109 | A1 | 9/2008 | Sakurai | |
| 2011/0160927 | A1 | 6/2011 | Wilson et al. | |
| 2011/0208701 | A1* | 8/2011 | Jackson | G06Q 10/10 707/687 |
| 2014/0019088 | A1* | 1/2014 | Leonard | G06F 17/18 702/178 |
| 2014/0019909 | A1 | 1/2014 | Leonard et al. | |
| 2014/0108209 | A1* | 4/2014 | Lo Faro | G06Q 40/02 705/30 |
| 2014/0136454 | A1 | 5/2014 | Hirade | |
| 2014/0324521 | A1* | 10/2014 | Mun | G06Q 10/06393 705/7.28 |
| 2015/0278153 | A1* | 10/2015 | Leonard | G06F 17/18 702/178 |
| 2015/0289149 | A1* | 10/2015 | Ouyang | H04W 24/02 370/252 |

OTHER PUBLICATIONS

Schreck et al.; "Visual Exploration of Local Interest Points in Sets of Time Series", Visual Analytics Science and Technology (VAST), 2012 IEEE Conference on, Oct. 14-19, 2012, pp. 239-240.

Deng, "Time Series Decomposition Using Singular Spectrum Analysis", Master's Thesis, East Tennessee State University, Master of Science in Mathematical Sciences, Mar. 2014, 81 pp.

Baheti et al.; "Trend Analysis of Time Series Data Using Data Mining Techniques", Big Data (BigData Congress), 2014 IEEE International Congress on, Jun. 27-Jul. 2, 2014, pp. 430-437.

Jia et al.; "Study of Track Irregularity Time Series Calibration and Variation Pattern At Unit Section", Research Article, Hindawi Publishing Corporation, Computational Intelligence and Neuroscience, vol. 2014, Article ID 727948, Published Nov. 4, 2014, 15 pp.

Killick, et al., "Changepoint: An R Package for Changepoint Analysis," Journal of Statistical Software, vol. 58, Issue 3, Jun. 2014, 19 pp.

"Seasonaility 6.4.4.3," NIST/SEMATECH e-Handbook of Statistical Methods, retrieved on Nov. 5, 2014, from http://www.itl.nist.gov/div898/handbook/pmc/section4/pmc443.htm, 5 pp.

Grillenzoni, et al., "Sequential smoothing for turning point detection with application to financial decisions," Applied Stochastic Models in Business and Industry, vol. 30, Issue 2, Sep. 2012, pp. 132-140.

Tsay, "Outliners, Level Shifts, and Variance Changes in Time Series," Department of Statistics, Journal of Forecasting, vol. 7, revised on Aug. 1987, 20 pp.

"List of Patents treated as related," Appendix P, 2 pgs.

Office Action from U.S. Appl. No. 15/154,508, dated Oct. 17, 2017, 37 pp.

Amendment in Response to Office Action dated Oct. 17, 2017, from U.S. Appl. No. 15/154,508, filed Dec. 22, 2017, 16 pp.

Final Office Action from U.S. Appl. No. 15/154,508, dated Mar. 29, 2018, 31 pp.

Amendment in Response to Office Action dated Mar. 29, 2018, from U.S. Appl. No. 15/154,508, filed Jun. 27, 2018, 16 pp.

Office Action from U.S. Appl. No. 15/154,508, dated Sep. 18, 2018, 27 pp.

Amendment in Response to Office Action dated Sep. 18, 2018, from U.S. Appl. No. 15/154,508, filed Dec. 18, 2018, 17 pp.

Final Office Action from U.S. Appl. No. 15/154,508, dated Feb. 5, 2019, 12 pp.

Response to Final Office Action dated Feb. 5, 2019 from U.S. Appl. No. 15/154,508, filed Apr. 30, 2019, 13 pp.

Notice of Allowance from U.S. Appl. No. 15/154,508, dated Jun. 12, 2019, 12 pp.

* cited by examiner

US 10,453,007 B2

AUTOMATIC TIME SERIES EXPLORATION FOR BUSINESS INTELLIGENCE ANALYTICS

TECHNICAL FIELD

This disclosure relates to business intelligence systems, and more particularly, to business intelligence analytics systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may include analytics systems that may provide insights into collections of enterprise data. An analytics system may be used to explore data, determine cause and effect relationships among data, formulate predictions based on existing data, and support decision-making, for example.

SUMMARY

In one aspect of the invention, a method for generating characterizations of time series data includes extracting a trend-cycle component, a seasonal component, and an irregular component from a time series of data. The method further includes performing one or more pattern analyses on the trend-cycle component, the seasonal component, and the irregular component. The method further includes, for each pattern analysis of the one or more pattern analyses, performing a comparison of an analytic result of the respective pattern analysis to a selected significance threshold for the respective pattern analysis to determine if the analytic result passes the significance threshold for the respective pattern analysis. The method further includes generating an output for each of the analytic results that pass the significance threshold for the respective pattern analysis.

In another aspect, a computer system for generating characterizations of time series data includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to extract a trend-cycle component, a seasonal component, and an irregular component from a time series of data. The computer system further includes program instructions, stored on at least one of the one or more storage devices for execution by at least one of the one or more processors via at least one of the one or more memories, to, for each pattern analysis of the one or more pattern analyses, perform one or more pattern analyses on the trend-cycle component, the seasonal component, and the irregular component. The computer system further includes program instructions, stored on at least one of the one or more storage devices for execution by at least one of the one or more processors via at least one of the one or more memories, to perform a comparison of an analytic result of the respective pattern analysis to a selected significance threshold for the respective pattern analysis to determine if the analytic result passes the significance threshold for the respective pattern analysis. The computer system further includes program instructions, stored on at least one of the one or more storage devices for execution by at least one of the one or more processors via at least one of the one or more memories, to generate an output for each of the analytic results that pass the significance threshold for the respective pattern analysis.

In another aspect, a computer program product for generating characterizations of time series data includes a computer-readable storage medium having program instructions embodied therewith. The program instructions are executable by a computing device to extract a trend-cycle component, a seasonal component, and an irregular component from a time series of data. The program instructions are further executable by a computing device to, for each pattern analysis of the one or more pattern analyses, perform one or more pattern analyses on the trend-cycle component, the seasonal component, and the irregular component. The program instructions are further executable by a computing device to perform a comparison of an analytic result of the respective pattern analysis to a selected significance threshold for the respective pattern analysis to determine if the analytic result passes the significance threshold for the respective pattern analysis. The program instructions are further executable by a computing device to generate an output for each of the analytic results that pass the significance threshold for the respective pattern analysis.

The details of one or more embodiments of the disclosure are set forth in the accompanying drawings and the description below. Other features, objects, and advantages of the disclosure will be apparent from the description and drawings, and from the claims.

DETAILED DESCRIPTION

This disclosure is directed generally to techniques for a time series exploration system that provides automatic exploration of time series data and that may generate characterizations, insights, and analytic results about the time series data. The time series exploration system may receive an input of a series of data that varies over time, automatically perform a variety of statistical and other analysis techniques on the time series data, and identify analytical results with the highest relevance for output. The time series exploration system may be implemented as part of a business analytics system for business intelligence (BI). The time series exploration system may include subsystems for series decomposition, pattern analysis, and insight generation. The pattern analysis and insight generation subsystems may include or perform functions for comparing patterns and parameters of the time series data to relevance thresholds and identify major characteristics such as turning points in the times series data, and generating user interface outputs such as analytics visualizations that convey the major characteristics of the times series data.

The time series data exploration system may therefore generate relevant characterizations, insights, and analytic results about the time series data, without requiring the user to perform statistical analysis or characterization of the data. A user may benefit from insights and conclusions generated by the time series exploration system, and in some cases may be enabled to use those insights and conclusions to guide further modeling, interpretation, or presentation of the data.

Figure 1:
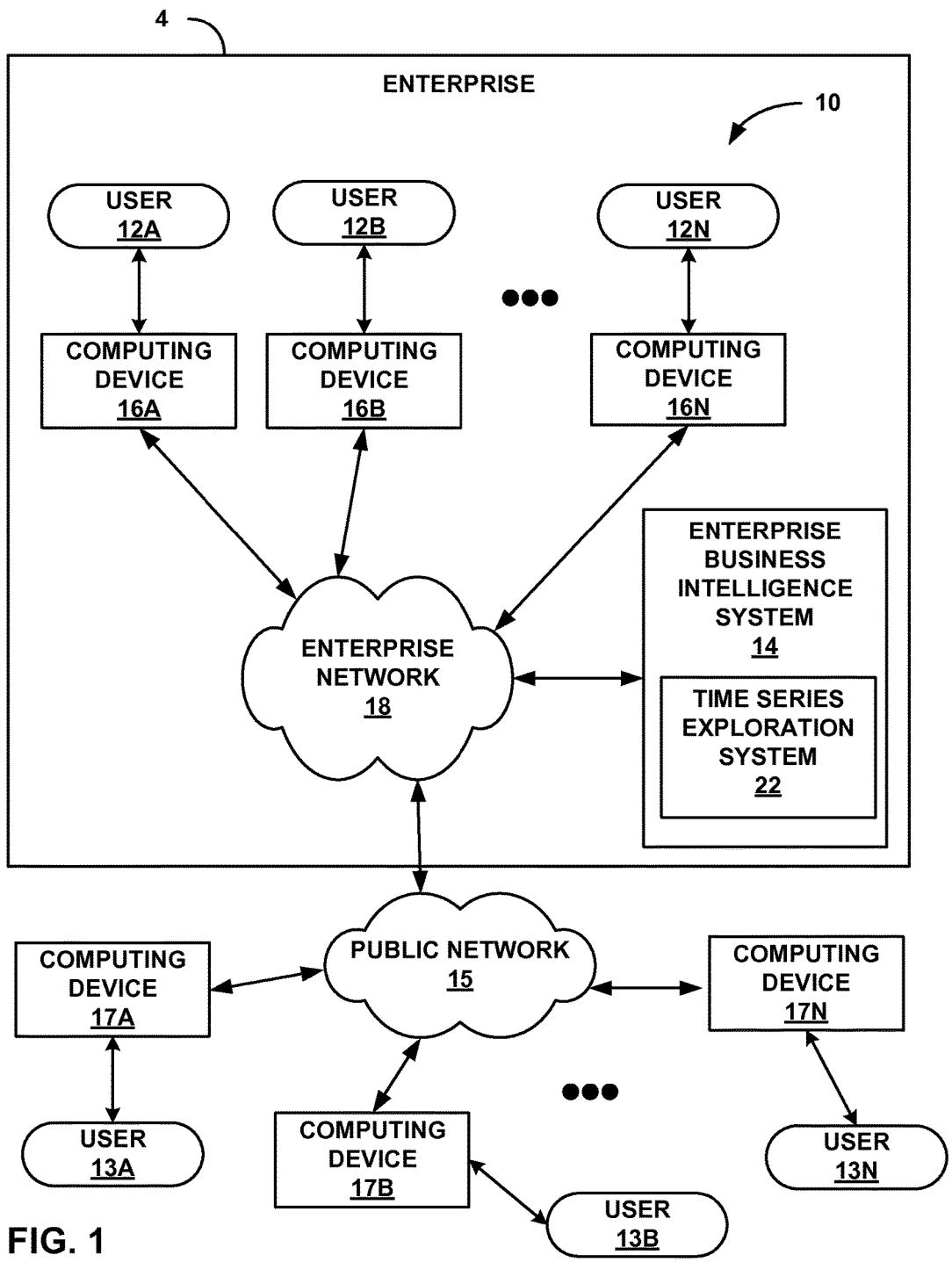
FIG. 1 is a block diagram illustrating an example enterprise software system having a computing environment in which users interact with an enterprise business intelligence system and data sources accessible over a public network.

FIG. 1 illustrates an example context in which a time series exploration system of this disclosure may be implemented and used. FIG. 1 is a block diagram illustrating an example enterprise 4 having a computing environment 10 in which a plurality of users 12A-12N within enterprise 4 (collectively, "enterprise users 12" or "users 12") may interact with an enterprise business intelligence (BI) system 14 that includes a time series exploration system 22, as described further below. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15, including external client computing devices 17A-17N (collectively, "external client computing devices 17" or "computing devices 17") used by external users 13A-13N ("external users 13"). Enterprise 4 may thus make time series exploration system 22 available to any of users 12 or external users 13.

Users 12, 13 may use a variety of different types of computing devices 16, 17 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. An external user 13 may also access time series exploration system 22 via a smartphone, tablet computer, or similar device, running a business intelligence dashboard in a web browser, a dedicated mobile application, or other means for interacting with certain externally surfaced functions of enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
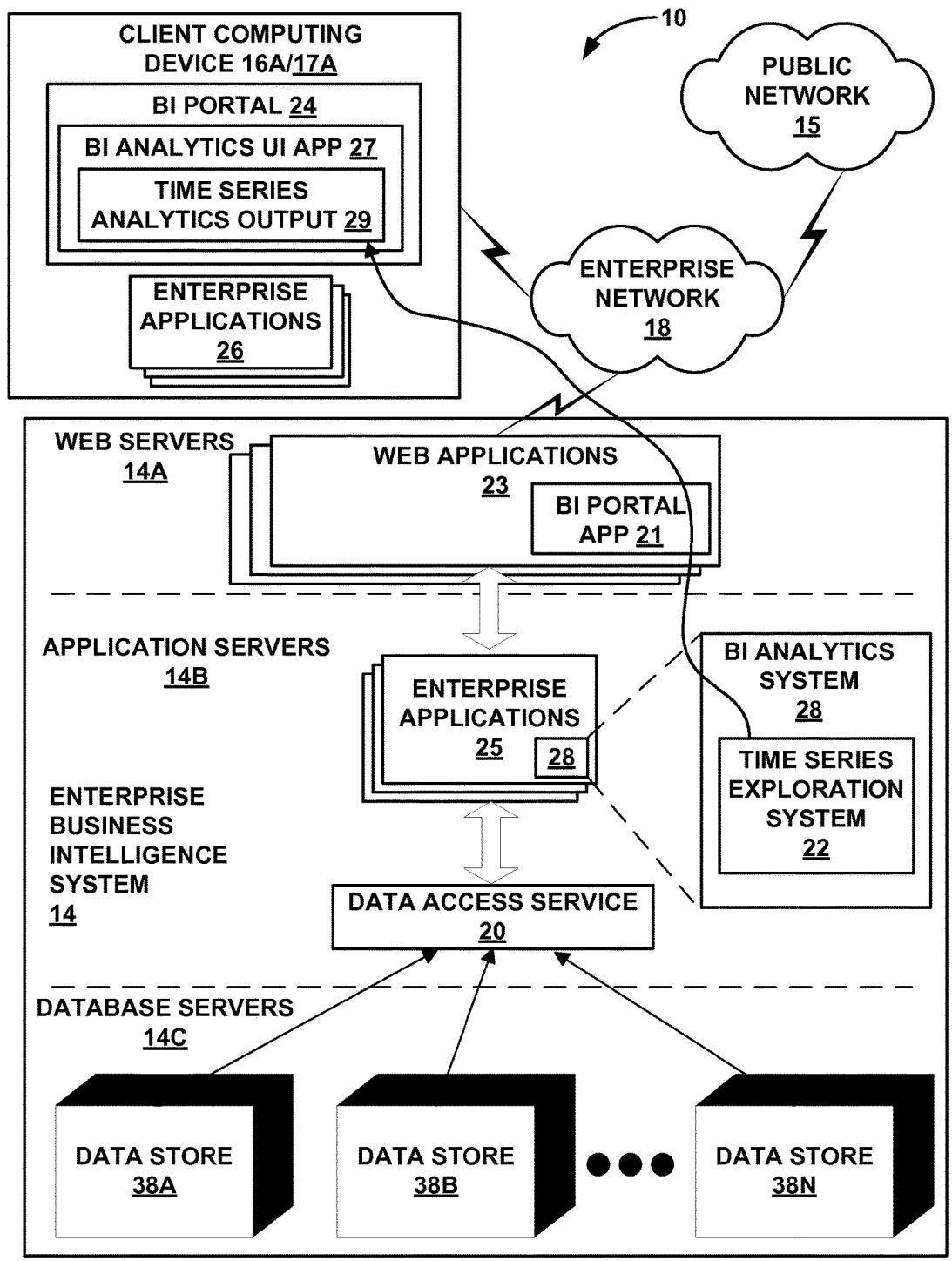
FIG. 2 is a conceptual block diagram illustrating in further detail portions of one embodiment of enterprise business intelligence (BI) computing environment that includes a BI analytics system including a time series exploration system as part of an enterprise BI computing system.

FIG. 2 is a conceptual block diagram illustrating in further detail portions of one embodiment of enterprise business intelligence (BI) computing environment 10 that includes a BI analytics system 28 including time series exploration system 22 as part of an enterprise BI computing system 14. In this example implementation, a single client computing device 16A is shown for purposes of example and includes a BI portal 24 and one or more client-side enterprise software applications 26 that may utilize and manipulate data, including to view analytics tools and data visualizations with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may include a user interface for a BI analytics user interface (UI) application 27 that may interact with a BI analytics system 28 that comprises time series exploration system 22. BI analytics UI application 27 may enable a user of one of client computing devices 16, 17 to enter analytics queries regarding time series data, in response to which time series exploration system 22 may generate time series analytics outputs, as further described below.

BI portal 24 may also output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. BI portal 24 may also provide visualizations of data based on pattern analysis and statistical analysis results generated by time series exploration system 22, for example.

Time series exploration system 22 may be hosted among enterprise applications 25, as in the example depicted in FIG. 2, or may be hosted elsewhere, including on a client computing device 16A/17A (which may be a client computing device 16A internal to enterprise computing environment 10 or a client computing device 17A external to enterprise computing environment 10 in different examples), or distributed among various computing resources in enterprise business intelligence system 14, in some examples. Time series exploration system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include time series exploration system 22 as one of enterprise software applications 25 or as a portion or portions of one or more of enterprise software applications 25.

The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of time series data, or any set of data that varies over a period of time or has a series of time-indexed entries, for example.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include pattern analysis and statistical analysis results generated by time series exploration system 22.

As described above and further below, time series exploration system 22 may be implemented in one or more computing devices, and may involve one or more applications or other software modules that may be executed on one or more processors. Example embodiments of the present disclosure may illustratively be described in terms of the example of time series exploration system 22 in various examples described below.

Figure 3:
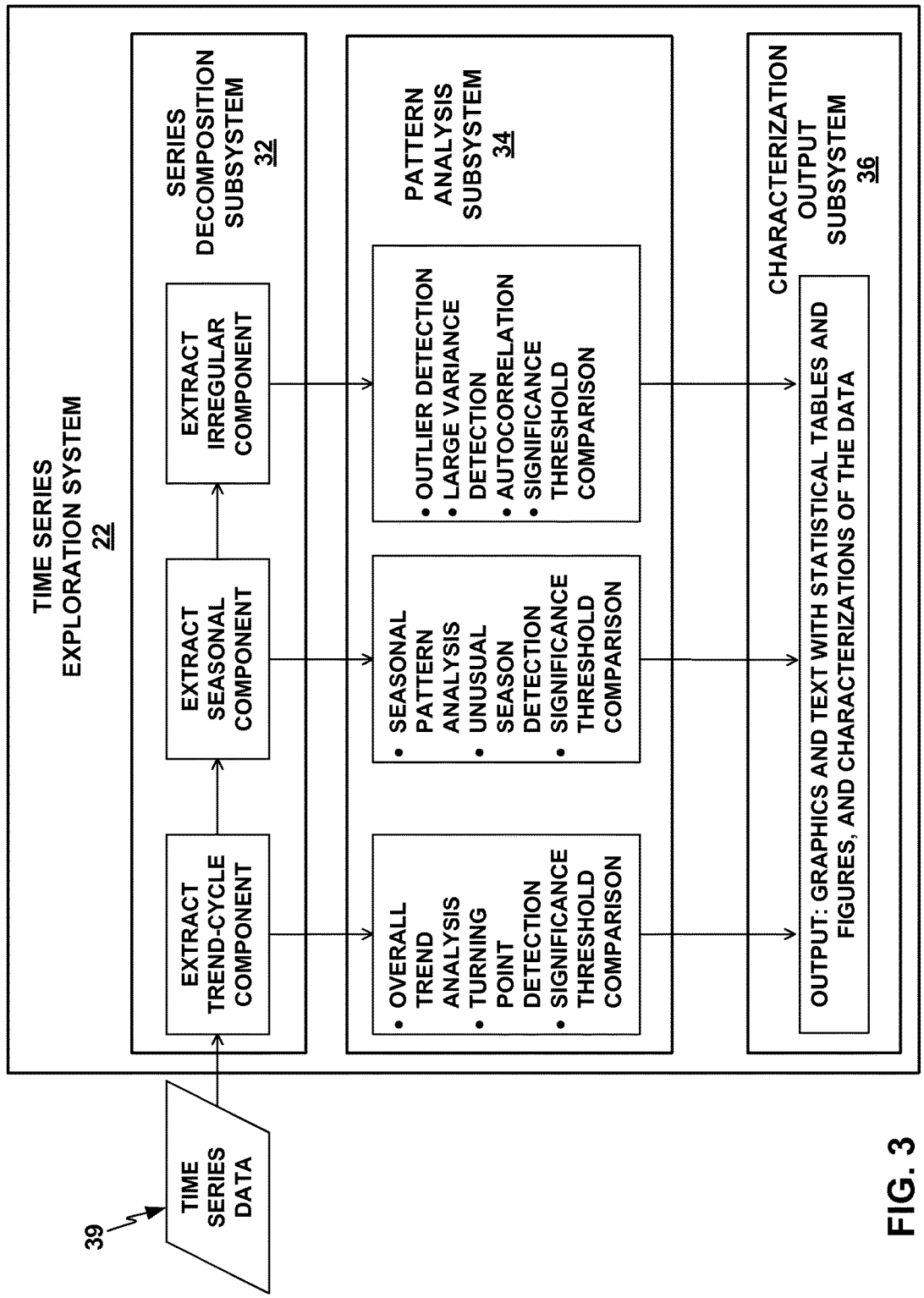
FIG. 3 depicts a flowchart showing a top-level architecture of a time series data exploration system in an example of this disclosure.

FIG. 3 depicts a flowchart showing a top-level architecture of an example time series exploration system 22 in an example of this disclosure. As noted above, time series exploration system 22 may include a series decomposition subsystem 32, a pattern analysis subsystem 34, and an characterization output subsystem 36 (collectively, "subsystems 32-36"). Subsystems 32-36 may each be software applications, groups of applications, portions of a single application, or other types of portions of software as part of time series exploration system 22, in various examples. Series decomposition component 32 may decompose an example time series data set 39 into three main data set components: trend-cycle, seasonal and irregular (where the irregular component may include error, both random and systemic). Pattern analysis subsystem 34 may receive the data set components from series decomposition component 32 and perform any of various analytical functions on each of the three data set components, and thereby generate results of the various analyses, any of which may be referred to as "analytic results." Characterization output subsystem 36 may receive the results of the analytical functions performed on the data set components from pattern analysis subsystem 34 and generate user outputs such as charts, other graphics, and plain language text that point out basic characterizations of the time series data set, that may yield insights into the data.

As noted above, pattern analysis subsystem 34 may perform a wide variety of analytical techniques on the three main components. As a particular example, pattern analysis subsystem 34 may perform analyses on the trend-cycle data component such as overall trend analysis and detection of turning points. The results generated by pattern analysis subsystem 34 of the analysis of the trend-cycle component may include an indication of whether the overall trend is upward or downward, and points in time when the trend-cycle starts to change between upward and downward, for example.

As another example, pattern analysis subsystem 34 may perform analyses on the seasonal component such as seasonal pattern significance test and unusual season detection. The results generated by pattern analysis subsystem 34 of the analyses of the seasonal component may indicate whether there is a significant seasonal pattern that indicates a significant pattern strength, and whether there are some seasons that have unusually high or low values, for example.

As another example, pattern analysis subsystem 34 may perform analyses on the irregular component, such as outlier detection, large variance interval detection, and autocorrelation analysis. The results of the analysis of the irregular component may indicate whether there exists additional irregular variability after the time series of data is de-trended and de-seasoned, that is, after the trend and season components are removed, for example. It may also include information on detected outliers and variance changes and/or past values during the modeling and forecasting process, for example.

Pattern analysis subsystem 34 may also perform functions of identifying major characteristics from the results, such as by applying a set of rules to the results. The rules may include comparing parameters in the results with thresholds for turning points, significance, and other characterizing criteria that may help identify major changes or other major characteristics. Pattern analysis subsystem 34 may evaluate whether an analytic result surpasses a selected significance threshold for the respective pattern analysis that generates the result, to ensure that pattern analysis subsystem 34 focuses its outputs on patterns of genuine significance that may be relevant to exploration of the time series.

Characterization output subsystem 36 may generate user interface outputs based on the results of the analyses and identification of characteristics by pattern analysis subsystem 34, such as the examples described above. The user interface outputs generated by characterization output subsystem 36 may include text outputs, speech outputs, and/or graphical outputs with plain language insights, figures, and/or statistical tables.

Further details are presented as follows for example functions of series decomposition subsystem 32, pattern analysis subsystem 34, and characterization output subsystem 36 on an example time series data set 39. A user may upload, designate, or identify a time series data set, and time series exploration system 22 may apply the functions of series decomposition subsystem 32, pattern analysis subsystem 34, and insight generation subsystem 36 to time series data set 39.

Series decomposition subsystem 32 may decompose a seasonal time series $X_t$ of length n and periodicity s, into three components as follows:

$$X_t = TC_t + S_t + I_t$$

where $TC_t$, $S_t$ and $I_t$ represent the trend-cycle, seasonal, and irregular components, respectively. Series decomposition subsystem 32 may determine the trend-cycle component $TC_t$ by centering a moving average of $X_t$.

Series decomposition subsystem 32 may determine the seasonal component $S_t$ from season factors by averaging the seasonal-irregular component, $SI_t = X_t - TC_t$, for each season. Series decomposition subsystem 32 may determine the irregular component by de-trending and de-seasoning from the original series, as $I_t = X_t - TC_t - S_t$. Series decomposition subsystem 32 may use computations with fast computation time to determine the trend-cycle, seasonal, and irregular components, to facilitate fast performance and fast generation of the insight outputs of time series exploration system 22. If the time series does not include seasonal variation, i.e., s=1, then the output of series decomposition subsystem 32 will simply be decomposed into trend-cycle and irregular components.

Pattern analysis subsystem 34 may perform different types of pattern analysis on each of the trend-cycle, seasonal, and irregular components as determined by series decomposition subsystem 32. For the trend-cycle component, pattern analysis subsystem 34 may perform an overall trend analysis and a detection of turning points, for example. In the overall trend analysis, pattern analysis subsystem 34 may identify whether there is an overall trend in the time series data and whether the data is trending up or down over time. The overall trend may be defined as the time correlation between the trend-cycle component ($TC_t$) and time (t). Pattern analysis subsystem 34 may illustratively compute the time correlation "timecorr" as $$timecorr = \frac{1}{n-1} \sum_{t=1}^{n} \left( \frac{TC_t - \overline{TC}}{S_{TC}} \right) \left( \frac{t - \frac{1+n}{2}}{\sqrt{\frac{1}{n-1}\left[\frac{(n+1)^3}{12} - \frac{(n+1)^2}{4} + \frac{(n+1)}{6}\right]}} \right)$$

where n is the number of time points in the trend-cycle component, and $\overline{TC}$ and $S_{TC}$ are the mean and standard deviation of the trend-cycle component, respectively.

Pattern analysis subsystem 34 may then determine if the overall or long term trend is downward or upward or none by comparing timecorr with a selected threshold $c_1$, i.e., if timecorr<$-c_1$, the overall trend is downward;

if |timecorr|≤$c_1$, the series had no significant upward or downward trend;

if timecorr>$c_1$, the overall trend is upward;

where the threshold $c_1$ may be selected to be 0.2, for example.

Pattern analysis subsystem 34 may perform turning point detection to detect when a trend or cycle starts to change direction. A turning point may illustratively be defined as a date or time t, according to the following two rules. The first rule pattern analysis subsystem 34 may apply in detecting a turning point is to determine if the trend-cycle component monotonically increases or decreases before t and then reverses, and monotonically decreases (if previously monotonically increasing) or increases (if previously monotonically decreasing) after t, i.e., $TC_{t-l} < \ldots < TC_{t-1} \leq TC_t$ and
$TC_t > TC_{t+1} > \ldots > TC_{t+m}$ or $TC_{t-l} > \ldots > TC_{t-1} \geq TC_t$ and
$TC_t < TC_{t+1} < \ldots < TC_{t+m}$ where l and m may be different, and the minimum value for them is periodicity, i.e., l≥s; m≥s, if the data is in a seasonally affected time series. Otherwise, pattern analysis subsystem 34 may apply a selected constant as a minimum value, such as 5, for example.

The second rule pattern analysis subsystem 34 may apply in detecting a turning point is to determine if a decrease or increase, respectively, in magnitude after t is larger than a selected threshold $c_2$, i.e., $$\frac{|TC_{t+m} - TC_t|}{|TC_t|} \geq c_2.$$

For example, the threshold $c_2$ may be selected to be 20% such that the change in magnitude would need to be at least 20% after the direction changes, for pattern analysis subsystem 34 to qualify the direction change as significant (and filter out less significant fluctuations). Pattern analysis subsystem 34 may apply other thresholds higher or lower than 20% in other examples. Such a selected threshold may help filter out minor or irrelevant turning points and maintain focus on major or relevant turning points for the analytics outputs generated by characterization output subsystem 36.

Pattern analysis subsystem 34 may perform a one-way ANOVA F test to determine if there is a significant seasonal pattern. The null hypothesis may be that all seasonal factors are the same, i.e., $SF_1 = \ldots = SF_s$, where $$SF_k = \frac{\sum_{t \equiv k (mod s)} SI_t}{n_k}, k = 1, \ldots, s.$$

where $n_k$ is the number of non-missing records in the summation, and the notation t≡k(mod s) means that t and k have the same remainder after being divided by s. An example process pattern analysis subsystem 34 may perform is as follows. First, pattern analysis subsystem 34 may compute the F test statistic as:

$$F = \frac{SS_{season}/(s-1)}{SS_e/(n-s)}$$

where $$SS_{season} = \sum_{k=1}^{s} n_k (SF_k - \overline{SI})^2$$

with $$\overline{SI} = \frac{1}{n} \sum_{t=1}^{n} SI_t$$

and $$SS_e = \sum_{k=1}^{s} \sum_{t \equiv k (mod s)} (SI_t - SF_k)^2.$$

Pattern analysis subsystem 34 may then compute a statistical p-value as $$p_1 = 1 - \text{prob}(F_{s-1,n-s} < F)$$

where $F_{s-1,n-s}$ is a random variable that follows an F distribution with s−1 and n−s as numerator and denominator degrees of freedom, respectively (and the p-value is as normally understood in statistics). Pattern analysis subsystem 34 may then determine if $p_1 \leq \alpha_1$, where $\alpha_1$ is a selected significance threshold, to determine if there is a significant seasonal pattern. The default for $\alpha_1$ may be selected as 5%, for example, or may be larger or smaller in other examples.

Pattern analysis subsystem 34 may then determine the effect size of the F test, which may be referred to as eta square or ES, as:

$$ES = \frac{\sum_{k=1}^{s} n_k (SF_k - \overline{SI})^2}{\sum_{t=1}^{n} (SI_t - \overline{SI})^2}$$

Pattern analysis subsystem 34 may use ES to describe the strength of the seasonal pattern as follows: if ES≤$c_3$, the seasonal pattern is weak; if $c_3$<ES≤$c_4$, the seasonal pattern is moderate; and if ES>$c_4$, the seasonal pattern is strong. For example, the threshold $c_4$ and $c_5$ may be selected to be 0.04 and 0.36, respectively.

Pattern analysis subsystem 34 may then perform unusual season detection. If the seasonal pattern is significant, pattern analysis subsystem 34 may also detect if there exist seasons with unusually high or low seasonal value by computing a z-score for each season as follows:

$$z_k = \frac{SF_k - \text{mean}(S_t)}{sd(S_t)}, k = 1, \ldots, s,$$

where $S_t = SF_k$ if t≡k(mod s), and mean($S_t$) and sd($S_t$) are the estimates of mean and standard deviation of $S_t$, respectively. Pattern analysis subsystem 34 may identify an unusual season as exceeding a selected threshold $c_5$ as follows: if $z_k > c_5$, the $k^{th}$ season may be identified as having unusually high seasonal value, while if $z_k < -c_5$, the $k^{th}$ season may be identified as having unusually low seasonal value. Pattern analysis subsystem 34 may use a value for threshold $c_5$ selected to be 2 or 3 in some examples, but which may be higher than 3 or lower than 2 in other examples.

In some examples, pattern analysis subsystem 34 may also use median and median absolute deviation of $S_t$, median $(S_t)$ and $MAD(S_t)$, respectively, instead of mean and standard deviation of $S_t$. In these examples, pattern analysis subsystem 34 may use a z-score that may be modified accordingly based on a normality assumption.

Pattern analysis subsystem 34 may also perform some analyses in the irregular component, which may include detecting outliers, large variance intervals, and autocorrelation, for example. To perform outlier detection, pattern analysis subsystem 34 may determine if an irregular value $I_t$ satisfies the following z-score based condition:

$$z_t = \frac{|I_t - \bar{I}|}{sd(I_t)} > c_6$$

where $\bar{I}$ and $sd(I_t)$ are mean and standard deviation of $I_t$, respectively, and $c_6$ is a relevance threshold. If so, then pattern analysis subsystem 34 may identify $I_t$ as an outlier at time t. Pattern analysis subsystem 34 may use a selected value of 2 or 3 for $c_6$ in some examples, or may use another value higher than 3 or lower than 2 in other examples.

Pattern analysis subsystem 34 may also perform large variance interval detection. To do so, pattern analysis subsystem 34 may use a series of F tests to split an irregular time series into intervals with similar variances, then apply a chi-squared test to find the significant large variance intervals. These functions are further described as follows. First, pattern analysis subsystem 34 may identify points of time in the time series data in which the variance changes significantly. For an irregular series $I_t$, pattern analysis subsystem 34 may choose a window of length k and test whether local variances over $i-k < t \le i$ and over $i < t \le i+k$ are different based on an F test. For example, if the test statistic $$F_i = \frac{\sum_{t=i-k+1}^{i} (I_t - \bar{I}_{i,1})^2}{\sum_{t=i+1}^{i+k} (I_t - \bar{I}_{i,2})^2}$$

is larger than a critical value $F_{1-\alpha_2/2}(k-1,k-1)$ or less than $F_{\alpha_2/2}(k-1,k-1)$, where $\alpha_2$ is a significance level and the default may be selected as 5%, then pattern analysis subsystem 34 may identify time $t=i$ as a variance change point, and $\bar{I}_{i,1}$ and $\bar{I}_{i,2}$ as the local means over two time intervals $(i-k,i]$ and $(i,i+k]$, respectively.

Then, based on the existence of M variance change points that split the irregular time series into M+1 intervals, for the $i^{th}$ interval, pattern analysis subsystem 34 may compute a chi-squared test statistic as:

$$\chi_i^2 = \frac{(n_i - 1)s_i^2}{s^2}$$

where $n_i$ is the number of time point in the $i^{th}$ interval, $s_i^2$ is the variance in the $i^{th}$ interval, and $s^2$ is the grand variance, or the mean of variances of m+1 intervals, as follows:

$$s^2 = \sum_{i=1}^{M+1} s_i^2 / (M+1).$$

Pattern analysis subsystem 34 may then determine the corresponding p-value as:

$$p_i = 1 - \text{Prob}(\chi_{n_i-1}^2 < \chi_i^2)$$

where $\chi_{n_i-1}^2$ is a random variable following a chi-squared distribution with degree of freedom $n_i-1$. If $p_i \le \alpha_3$, then pattern analysis subsystem 34 may identify the interval as having a significantly large variance. The default for $\alpha_3$ may be selected as 5%, the same as $\alpha_1$, for example, or may be larger or smaller in other examples.

Pattern analysis subsystem 34 may also perform autocorrelation analysis on the irregular component. Based on the irregular series, pattern analysis subsystem 34 may compute J autocorrelation values, $\hat{\gamma}_1, \hat{\gamma}_2, \ldots, \hat{\gamma}_J$, and the corresponding standard errors, $se(\hat{\gamma}_1), se(\hat{\gamma}_2), \ldots, se(\hat{\gamma}_J)$. Pattern analysis subsystem 34 may use a value of J of $\max(2s+1, 10)$. For a given lag j, if $$\frac{|\hat{\gamma}_j|}{se(\hat{\gamma}_j)} > z_{1-\alpha_4/2},$$

where $z_{1-\alpha_4/2}$ is $100(1-\alpha_4/2)^{th}$ percentile of the standard normal distribution, where $\alpha_4$ is a significance level and the default may be selected as 5%, then pattern analysis subsystem 34 may determine the irregular time series at time t to be correlated with that at time t−j.

Characterization output subsystem 36 may output plain-language text outputs and/or graphical outputs with characterizations of the time series data based on the results of the pattern analyses and of applying rules and/or threshold comparisons by pattern analysis subsystem 34, in some examples. The characterization outputs may provide a user with insights into the time series data. The rules may be derived from the statistical analyses and other outputs and results generated by pattern analysis subsystem 34, as described above. A variety of example outputs by characterization output subsystem 36 as described above are summarized as follows.

Figure 4:
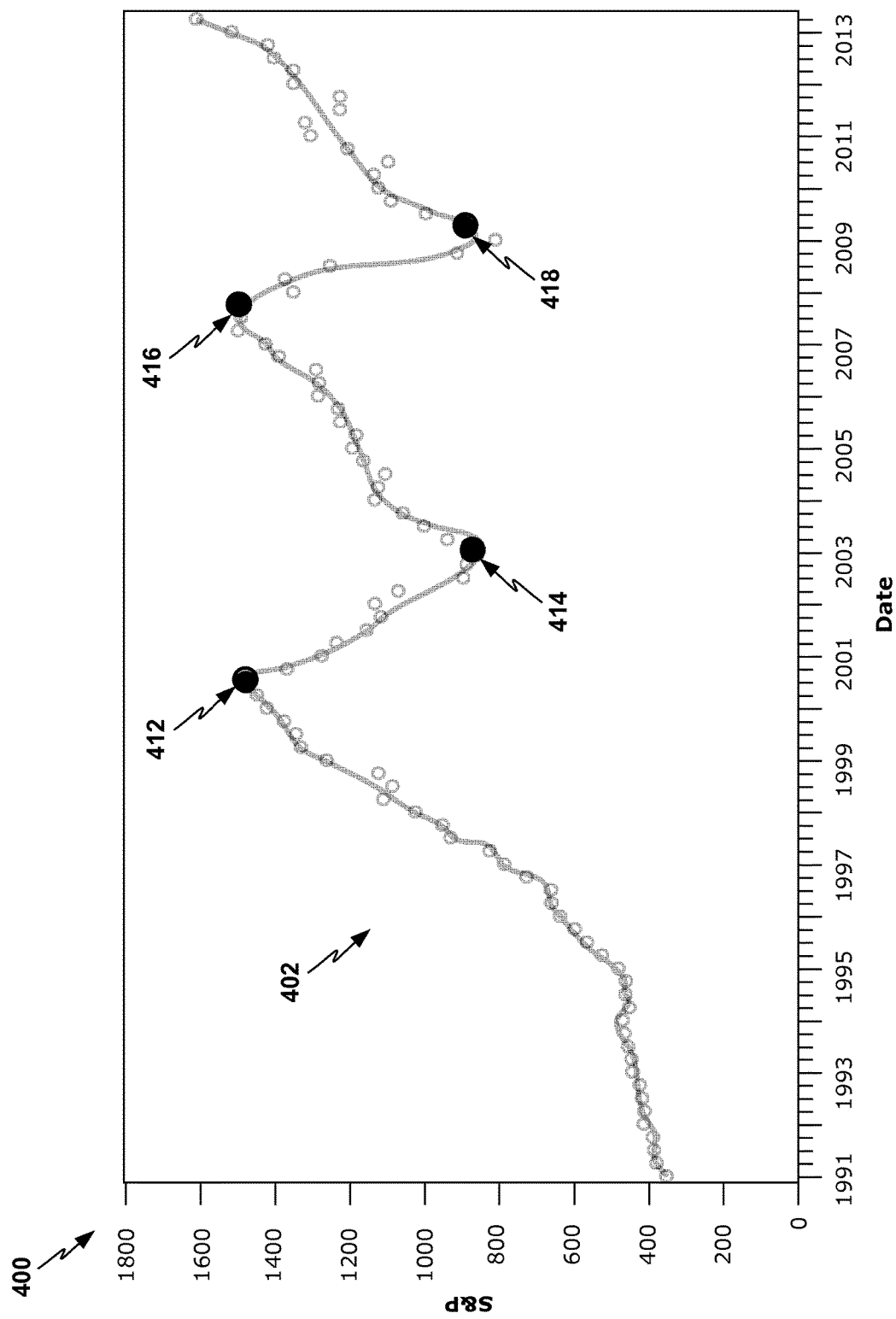
FIG. 4 shows an example graph of a set of time series data with characterizations that may be generated by a time series data exploration system in one example.

FIG. 4 shows an example graph 400 of a set of time series data with characterizations that may be generated by time series exploration system 22 in one example. Graph 400 is based on an overall trend pattern analysis with time correlation (timecorr) statistical analysis and a time correlation threshold, and a turning point pattern analysis with indications of the points in time of the turning points and with thresholds for increasing and decreasing magnitudes. Graph 400 includes trend line 402 that shows the trend-cycle series for all the individual data points (represented as small dots) in the time series, and indicates that overall the series trended upward. Graph 400 further includes four large dots 412, 414, 416, 418 to indicate turning points in trend line 402. The pattern analyses, statistical analyses, and characterization rules and thresholds incorporated in graph 400 by time series exploration system 22 are summarized below in Table 1.

TABLE 1

| Pattern analysis | Statistics | Characterization rules and thresholds |
| --- | --- | --- |
| Overall trend analysis | Time correlation (timecorr) | If timecorr < $-c_1$, the series trended downwards overall.<br>If |timecorr| ≤ $c_1$, the series had no significant upward or downward trend.<br>If timecorr > $c_1$, the series trended upward overall.<br>The time correlation threshold $c_1$ may be selected as $c_1 = 0.2$ for example. |
| Turning point detection | Times at which turning points occur Increase/decrease magnitudes | The highlighted points indicate the times at which the trend changes between increasing and decreasing. The turning point threshold for a magnitude of increase or decrease may be selected as $c_2 = 20\%$, for example. |

Figure 5:
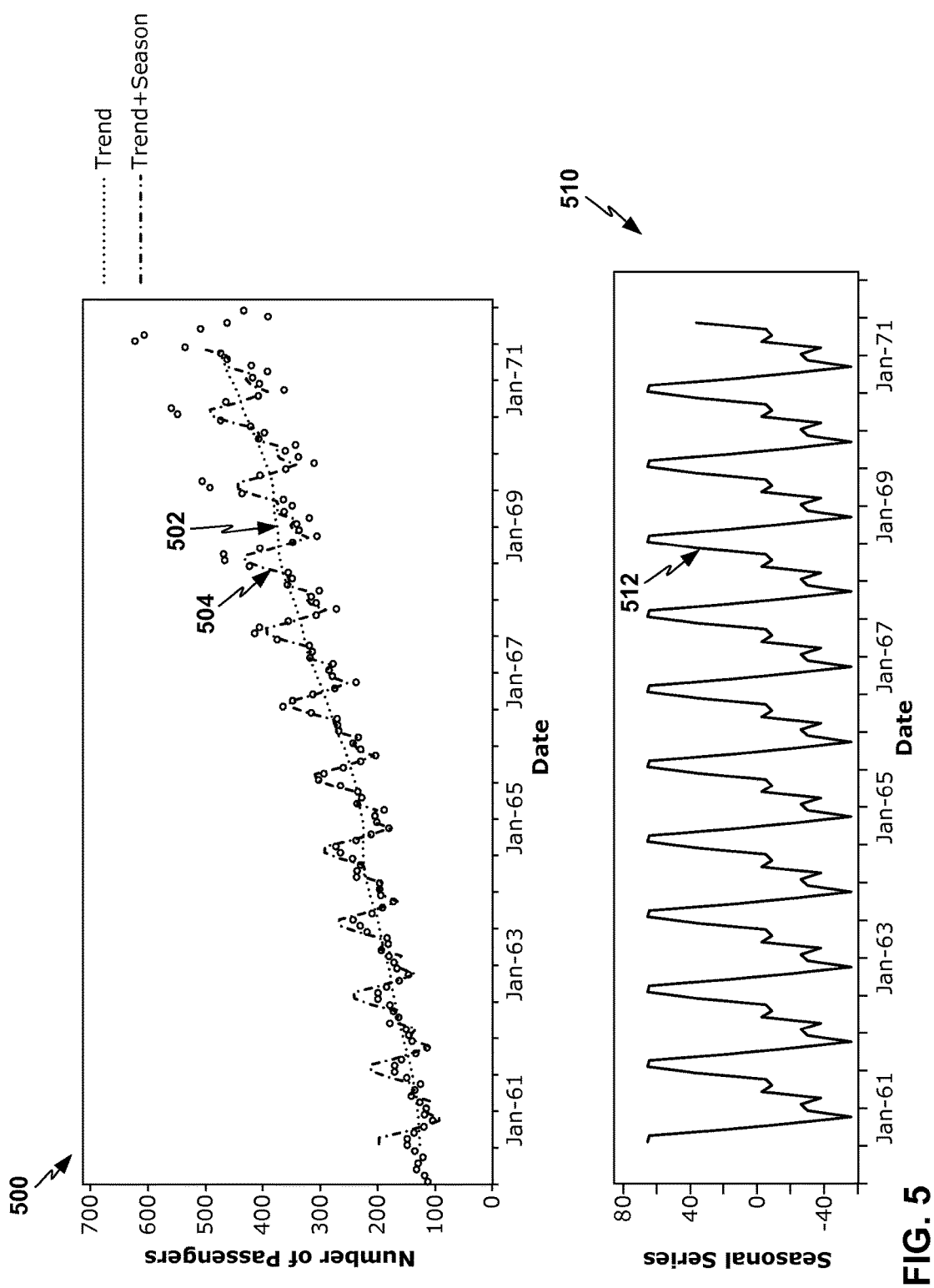
FIG. 5 shows example graphs of another example set of time series data with characterizations of the data, as an output that may be generated by time series exploration system.

FIG. 5 shows example graphs 500 and 510 of another example set of time series data with characterizations of the data, as an output that may be generated by time series exploration system 22. Graph 500 includes a plot of the data points in this example time series along with plots of the trend-cycle component line 502 and a trend-cycle plus seasonal components line 504 based on analysis results generated by time series exploration system 22. Trend-cycle component line 502 is generated by series decomposition subsystem 32 to represent the trend-cycle component of the data points in the time series, whereas trend-cycle plus seasonal components line 504 is generated by series decomposition subsystem 32 to represent the combined or superimposed trend-cycle component and seasonal components of the data points in the time series. Graph 510 shows a plot line 512 of the seasonal component as isolated from the other components.

Series decomposition subsystem 32 may generate the trend-cycle and seasonal components as represented in FIG. 5 based on the data in the time series in accordance with the techniques as described above. The seasonal pattern significance test techniques applied by pattern analysis subsystem 34 may include a statistical test based on the p-value and strength of the seasonal pattern based on effect size (ES), and an unusual season detection based on Z scores, and with significance thresholds for each. For example, pattern analysis subsystem 34 may compare the p-value to $\alpha_1$ as discussed above, and determine that $p_1 \le \alpha_1$, showing that the seasonal pattern is significant over the upward trend-cycle component. This determined significance of the seasonal pattern over the upward trend-line component is reflected in the contrast of trend-cycle plus seasonal components line 504 to trend-cycle component line 502 in graph 500, and in the prominence of seasonal component plot line 512 in graph 510. Graphs 500 and 510 thus show that the twelve monthly factors are clearly different, and that the time series has a strong seasonal pattern.

Figure 6:
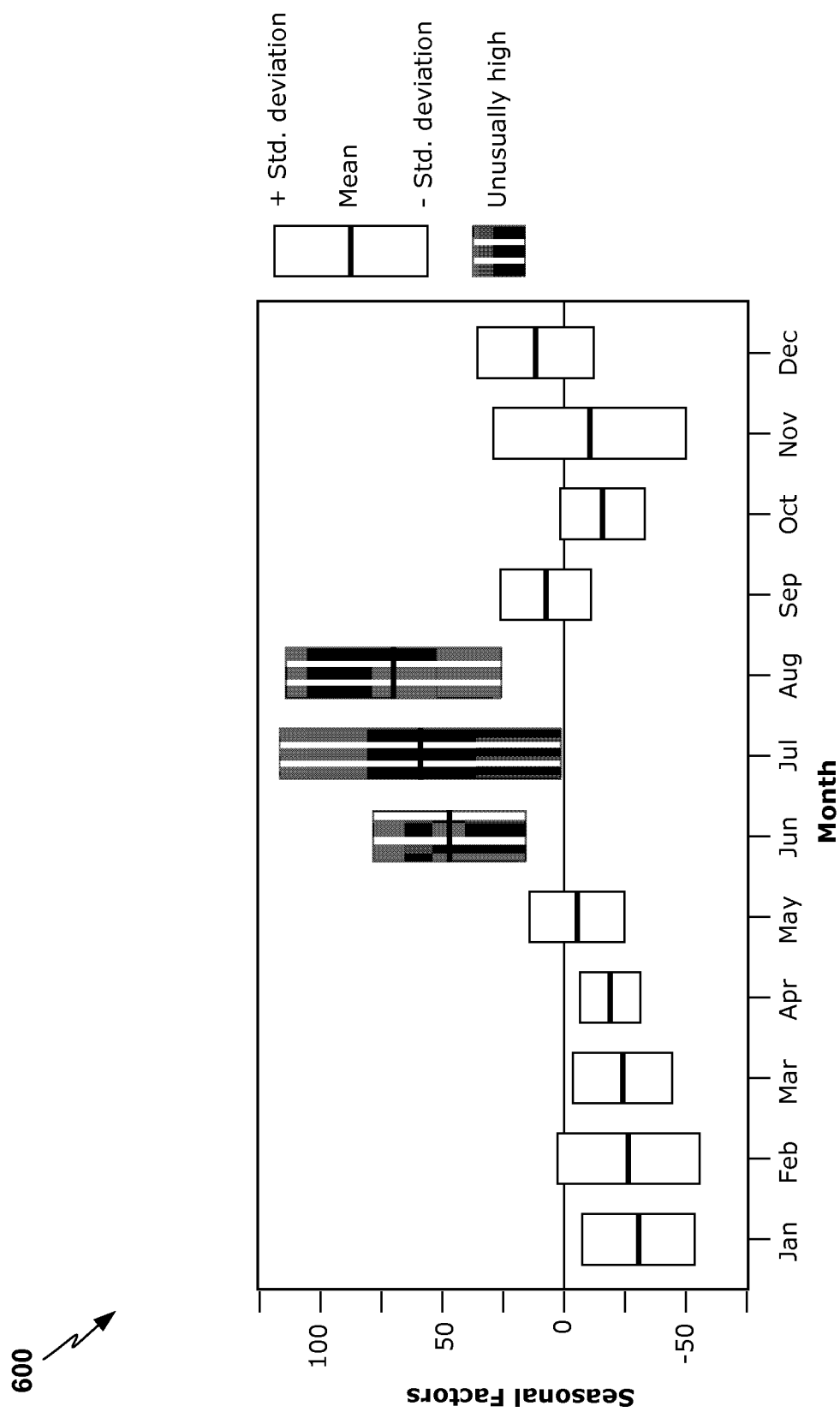
FIG. 6 shows a graph of seasonal variation per month of the same time series data represented in FIG. 5, where the graph in FIG. 6 shows the results of a seasonal factor effect size analysis by a pattern analysis subsystem.

FIG. 6 shows a graph 600 of seasonal (monthly) variation of the same time series data represented in graph 500 in FIG. 5, where graph 600 shows the results of a seasonal factor effect size analysis by pattern analysis subsystem 34. Graph 600 is a bar chart covering the twelve months of data from the time series where each bar represents the mean and plus and minus one standard deviation of the seasonal factor of the data for that month. Time series exploration system 22 may apply two thresholds to effect size (ES) in this example, a first threshold to separate moderate from weak seasonal pattern, and a second threshold to separate strong from moderate seasonal pattern. Time series exploration system 22 may apply these two effect size thresholds with selected values of 0.04 and 0.36 in this example, though time series exploration system 22 may use higher or lower threshold values in other examples.

Time series exploration system 22 may determine seasonal Z-scores in accordance with the Z-score equation shown and described above to detect unusual seasons. Time series exploration system 22 may apply a seasonal Z-score threshold of 3 in this example, but may use higher or lower threshold values in other examples. As graph 600 shows, in this example time series, the summer months (June, July, August) have unusually high values for seasonal factors, and time series exploration system 22 may determine that the summer season has a high seasonal Z-score, above the seasonal Z-score threshold indicating an unusual season, in this example.

TABLE 2

| Pattern analysis | Statistics | Characterization rules and thresholds |
| --- | --- | --- |
| Seasonal pattern test | F statistic and p-value | If $p_1 \le \alpha_1$, the series has a significant seasonal pattern.<br>The threshold $\alpha_1$ may be selected to be 5%, for example. |
| | Effect size (ES) | If ES ≤ $c_3$, the seasonal pattern is weak<br>If $c_3 <$ ES ≤ $c_4$, the seasonal pattern is moderate<br>If ES > $c_4$, the seasonal pattern is strong<br>The thresholds $c_3$ and $c_4$ may be selected to be 0.04 and 0.36, respectively, for example. |
| Unusual season detection | Z-scores of seasons | If $z_k > c_5$, the $k^{th}$ season has unusually high value<br>If $z_k < -c_5$, the $k^{th}$ season has unusually low value<br>The seasonal Z-score threshold $c_5$ may be selected as $c_5 = 3$, for example. |

Figure 7:
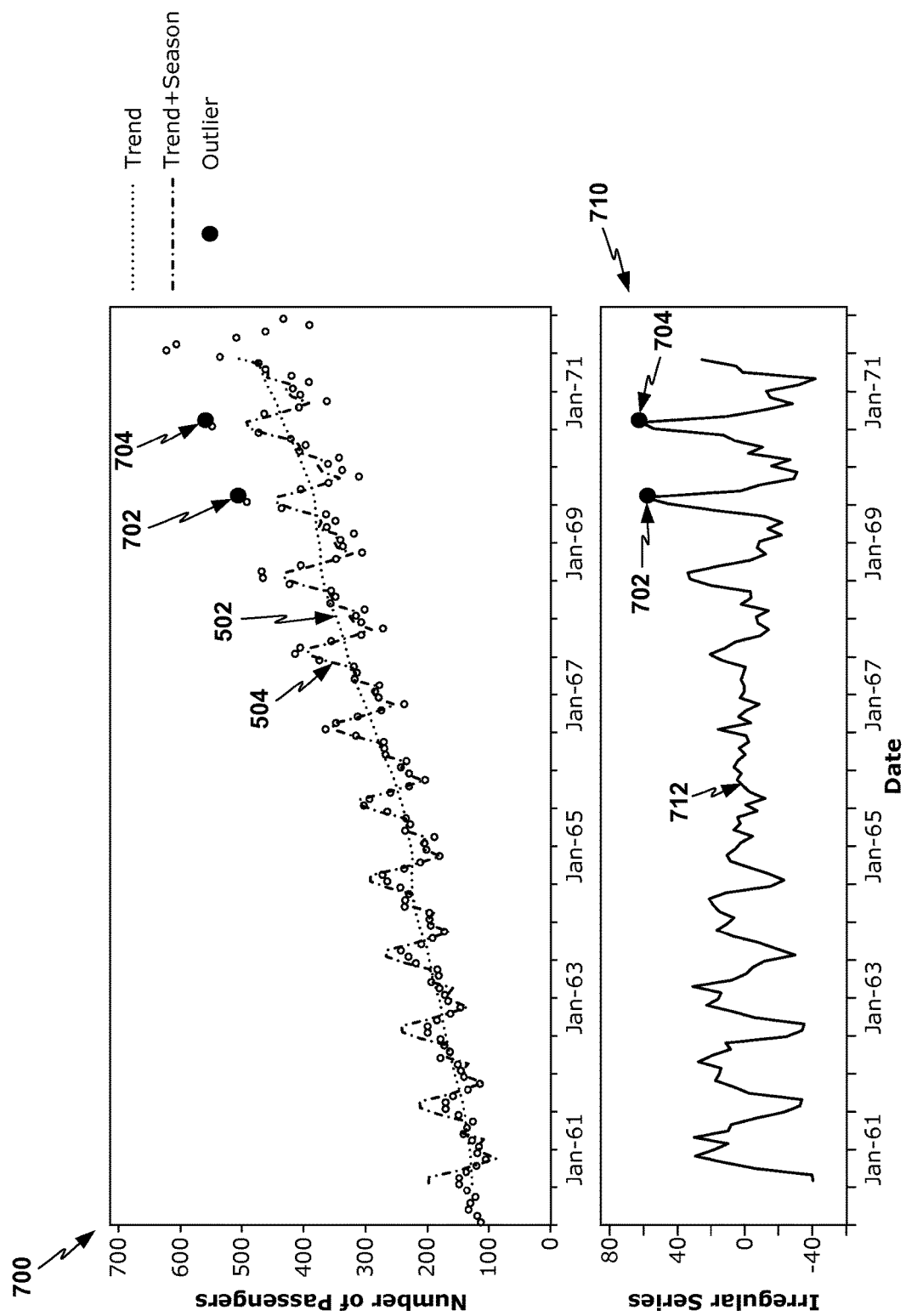
FIG. 7 shows a graph of a trend-cycle component line and trend plus seasonal components line plus plots of irregular components that emerge from an irregular pattern analysis of the data by a time series exploration system after removing the trend and seasonal components, and a graph of an isolated irregular component line with individual irregular components, in one example.

FIG. 7 shows graphs 700 and 710, where graph 700 shows trend-cycle component line 502 and trend-cycle plus seasonal components line 504 over all the individual data points (represented as small dots) and graph 710 shows an isolated irregular component line 712 which is the difference between individual data point and trend-cycle plus seasonal components line 504. Then the analyses applied to the irregular component may include an outlier detection, a large variance intervals detection and autocorrelation computation. For example, pattern analysis subsystem 34 may compute a Z score for each time point and identify times and dates of outliers when $z_t > c_6$ which $c_6$ is selected to be 2.5 in this example. As graphs 700 and 710 show, two time points, 702 and 704, are detected as outliers.

Figure 8:
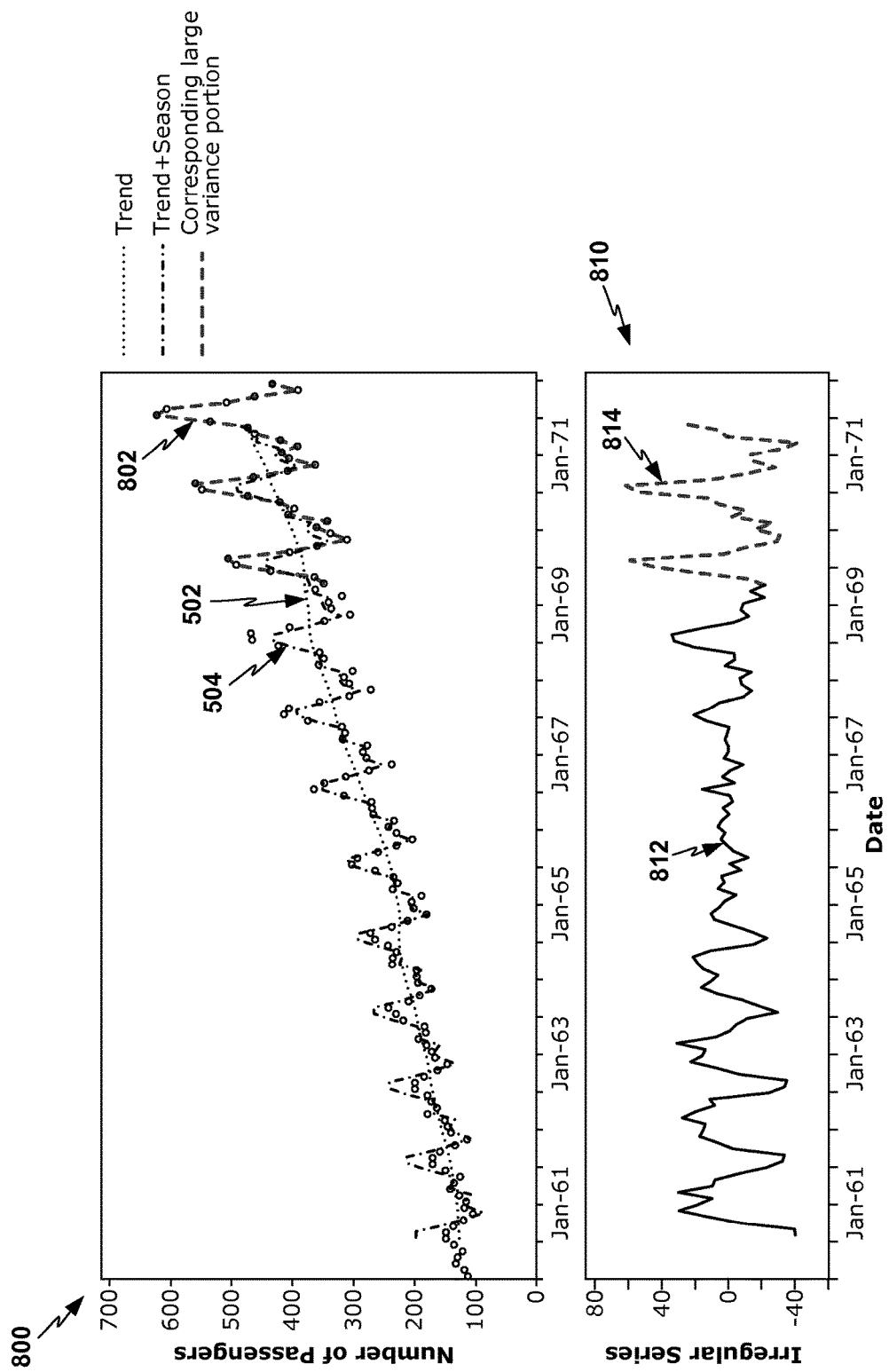
FIG. 8 shows a graph of a trend-cycle component line and a trend plus seasonal components line plus a large variance interval line generated by a time series exploration system performing an irregular pattern analysis for large variance intervals, and a graph of an irregular component line that includes an indicated large variance interval portion.

FIG. 8 shows graphs 800 and 810, where graph 800 shows trend-cycle component line 502 and trend-cycle plus seasonal components line 504 with a specially indicated large variance interval portion 802 in the original data corresponding to the large variance interval detected by an irregular pattern analysis in time series exploration system 22, and graph 810 shows irregular component line 812 that includes a specially indicated large variance interval portion 814. Time series exploration system 22 may generate graphs 800 and 810 by performing irregular pattern analysis including statistical tests for large variance intervals with values, and with a significance threshold for large variance intervals, such that time series exploration system 22 may indicate a large variance interval portion 814 in the irregular component and a corresponding large variance interval portion 802 in the original data points for the portions of the time series that exceed the significance threshold for large variance intervals.

Figure 9:
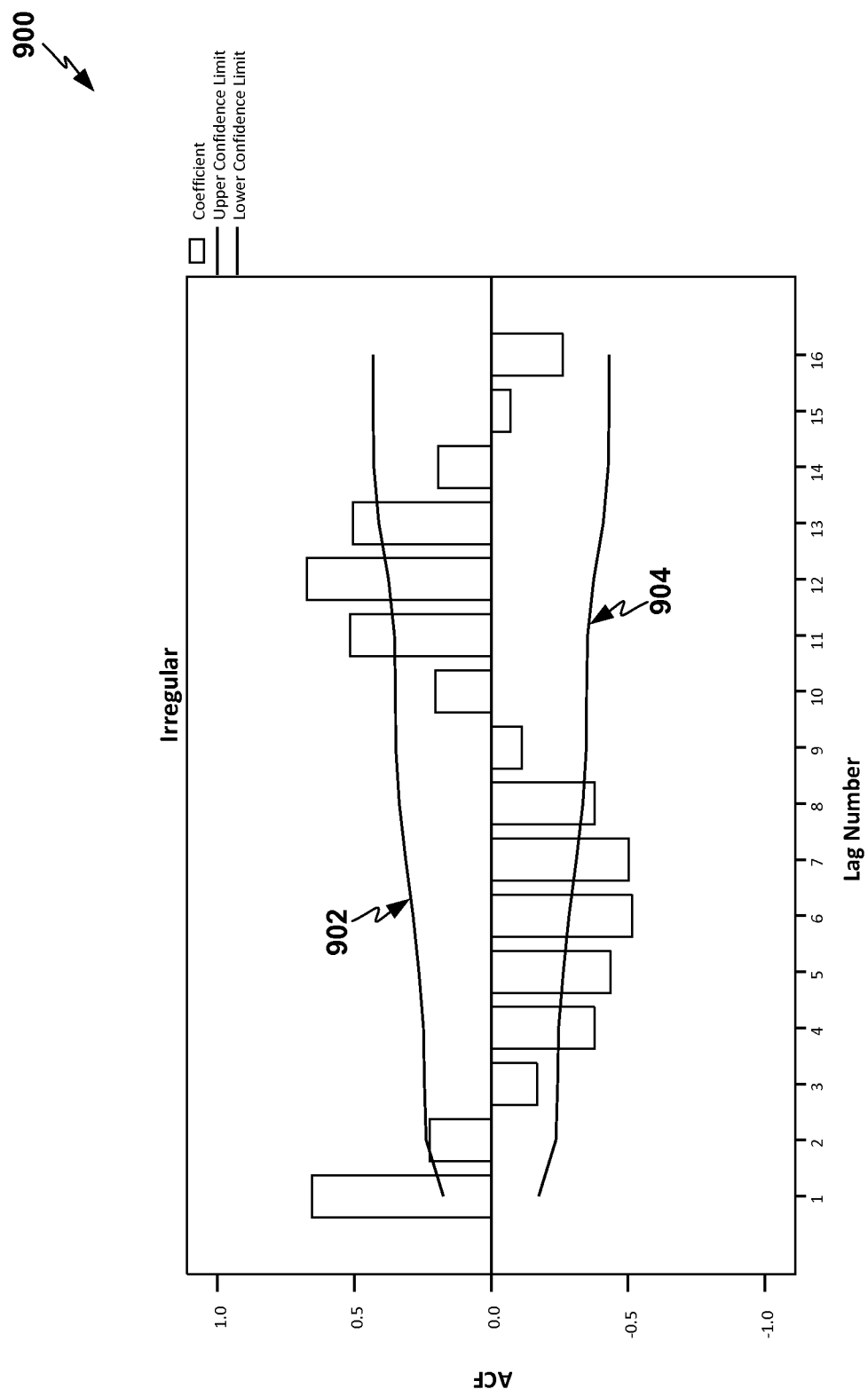
FIG. 9 shows a bar graph representing autocorrelation function (ACFs) coefficients per lag number that a time series exploration system may identify for the same time series shown in FIGS. 5-8, by performing another type of irregular pattern analysis to identify ACFs.

FIG. 9 shows graph 900 of bars representing autocorrelation function (ACFs) coefficients per lag number that time series exploration system 22 may identify for the same time series shown in FIGS. 5-8, by performing another type of irregular pattern analysis to identify ACFs, as described above. The ACFs indicate components of the time series data that show hysteretic carryover of influences from prior times to subsequent times, with the indicated lag number (on the x-axis). Graph 900 includes horizontal lines indicating upper confidence limit 902 and lower confidence limit 904. Bars extending outside upper confidence limit 902 and lower confidence limit 904 indicate that the corresponding ACFs in the corresponding lags are significant and there still exists serial correlation in the series after de-trending and de-seasoning. Upper confidence limit 902 and lower confidence limit 904 may be considered significance thresholds for ACFs, such that an ACF exceeding a confidence limit may be considered to be a significant ACF. Upper confidence limit 902 and lower confidence limit 904 may be selected as $se(\hat{\gamma}_j) \times z_{1-\alpha_4/2}$ and $-(se(\hat{\gamma}_j) \times z_{1-\alpha_4/2})$, respectively, in this example, as shown in graph 900.

The pattern analyses, statistical analyses, and characterization rules and thresholds incorporated in graphs 700, 710, 800, 810, and 900 by time series exploration system 22 are summarized below in Table 3.

TABLE 3

| Pattern analysis | Statistics | Characterization rules and thresholds |
|---|---|---|
| Irregular pattern analysis | Dates and times of outliers Z scores for outliers | If $z_t > c_6$, it is an outlier at time t. The outlier Z score threshold $c_6$ may be selected as $c_6 = 2.5$, for example. |
| | Large variance intervals | If $p_i \leq \alpha_3$, the $i^{th}$ interval is more volatile than other intervals. The threshold $\alpha_3$ may be selected to be 5%, for example. |
| | Auto-correlation functions (ACFs) $\hat{\gamma}_1$, $\hat{\gamma}_2$, ..., $\hat{\gamma}_J$ | If $|\hat{\gamma}_j| > se(\hat{\gamma}_j) \times z_{1-\alpha_4/2}$, the irregular series demonstrates hysteresis effects in which data at a selected time show influence from data from prior points in time. The threshold $\alpha_4$ may be selected to be 5%, for example, such that the value of $z_{1-\alpha_4/2}$ can be determined. |

Time series exploration system 22 may thus have several advantageous features. As one example, time series exploration system 22 may explore time series data and use the results of its analyses to present answers to a user's questions about each time series. Time series exploration system 22 may present answers and insights about the time series data in a user interface, in plain language text outputs and concise graphical outputs selected based on internal rules for highlighting or summarizing the likely most salient conclusions or insights for a given user.

Time series exploration system 22 may also be applied to any time series data from small sets of just one or a few time series of data up to large-scale bodies of arbitrarily many time series of data. For relatively smaller sets of time series data, time series exploration system 22 may simply generate analytic characterizations of the data on demand. For large sets of time series data that may be large enough to require significant processing burden, time series exploration system 22 may utilize MapReduce infrastructure to distribute different time series data into different mappers and perform analytics processes on the time series data in parallel to reduce the time required to generate the results.

Time series exploration system 22 may also select which pattern analyses and which statistical tests to perform, or select an order in which to perform the analyses and/or to output the results, based on which would be particularly relevant to a given time series of data, such as based on going in order of precedence through trend-cycle, seasonal, and irregular component analyses, in some examples. For example, for a particular time series of data, time series exploration system 22 may opt to perform turning point detection based on the trend-cycle component to indicate the points in time when the trend directions in the time series data are truly changed, above a significance threshold for trend turning points; unusual season detection to indicate which monthly values are much higher or lower, above a significance threshold for seasonal variation; and large variance interval detection to indicate which time intervals in the time series are more volatile, or above a significance threshold for de-trended and de-seasoned irregularity. All of these techniques may assist a user in gaining an intuitive understanding of the important properties of each time series.

Time series exploration system 22 may also select one or more data visualization graphics ("data visualizations") with which to generate or express a text and/or graphical outputs in a user interface, or collectively, time series analysis outputs. A data visualization may include a sequence chart, a bar chart, a bubble chart, a graph, or any other type of data visualization or graphic expression of the analyses of the time series data performed by time series exploration system 22. As shown in FIG. 2, time series exploration system 22 may output the time series analysis outputs 29, via BI portal application 21 among web applications 23 of enterprise BI system 14, to BI portal 24 and to BI analytics UI application 27, for BI analytics UI application 27 to display in a user interface of client computing device 16A.

Figure 10:
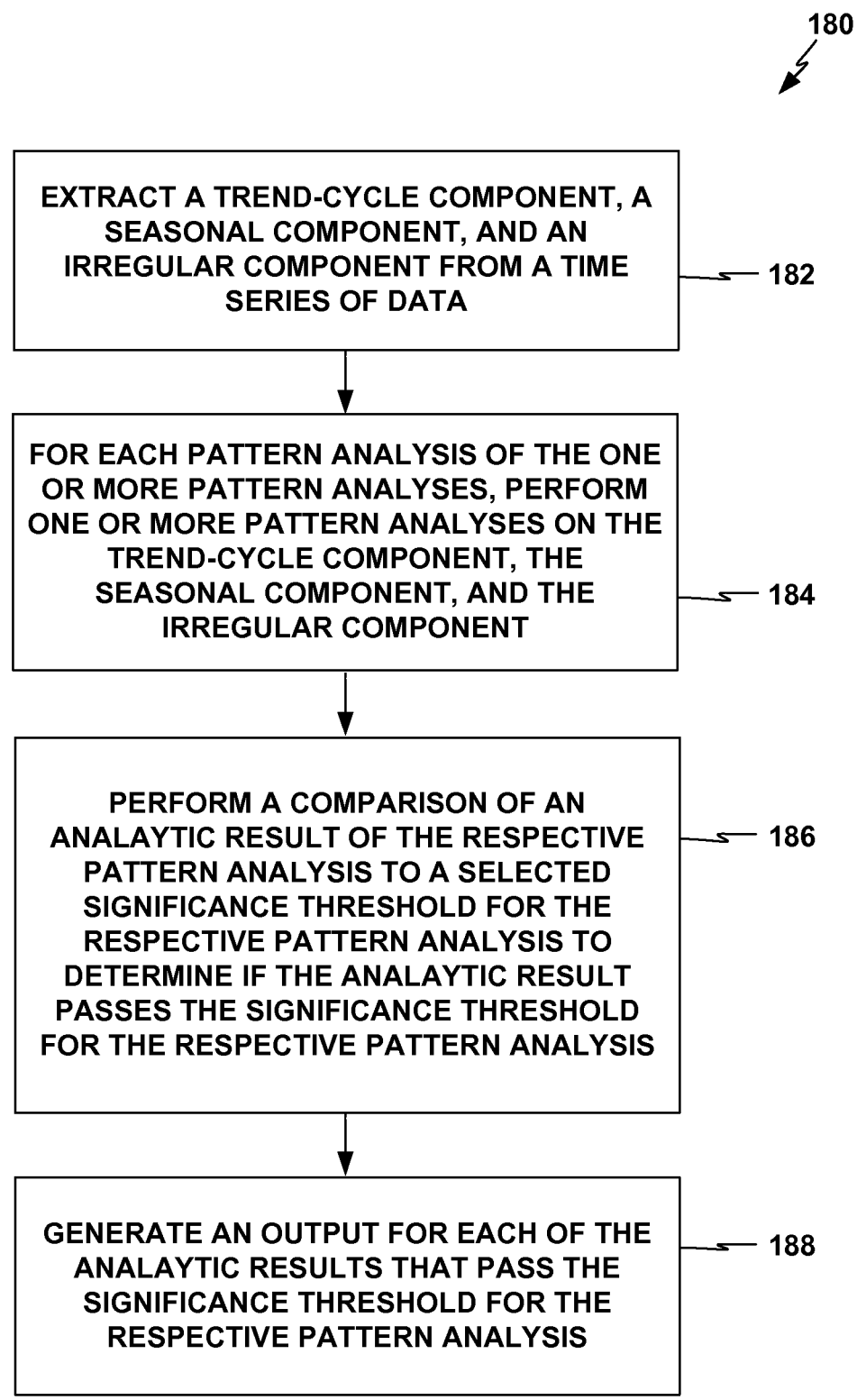
FIG. 10 shows a flowchart for an example overall process that a time series exploration system 22, executing on one or more computing devices may perform in some examples.

FIG. 10 shows a flowchart for an example overall process 180 that time series exploration system 22, executing on one or more computing devices (e.g., servers, computers, processors, etc.), may perform. Time series exploration system 22 may extract a trend-cycle component, a seasonal component, and an irregular component from a time series of data (e.g., by series decomposition as described above) (182). Time series exploration system 22 may, for each pattern analysis of the one or more pattern analyses, perform one or more pattern analyses on the trend-cycle component, the seasonal component, and the irregular component (e.g., perform an overall trend analysis using a time correlation statistic and/or a turning point detection on a trend-cycle component; perform a seasonal pattern significance test with an effect size indicating the strength of the seasonal pattern, and/or an unusual season detection analysis on a seasonal component; perform an outlier detection analysis, a large variance interval detection analysis, and/or autocorrelation functions analysis on an irregular component, and as further described above) (184). Time series exploration system 22 may perform a comparison of an analytic result of the respective pattern analysis to a selected significance threshold for the respective pattern analysis to determine if the analytic result passes the significance threshold for the respective pattern analysis (e.g., the significance thresholds as described above) (186). Time series exploration system 22 may generate an output for each of the analytic results that pass the significance threshold for the respective pattern analysis (e.g., plain language text outputs and graphics outputs as described above) (188).

Figure 11:
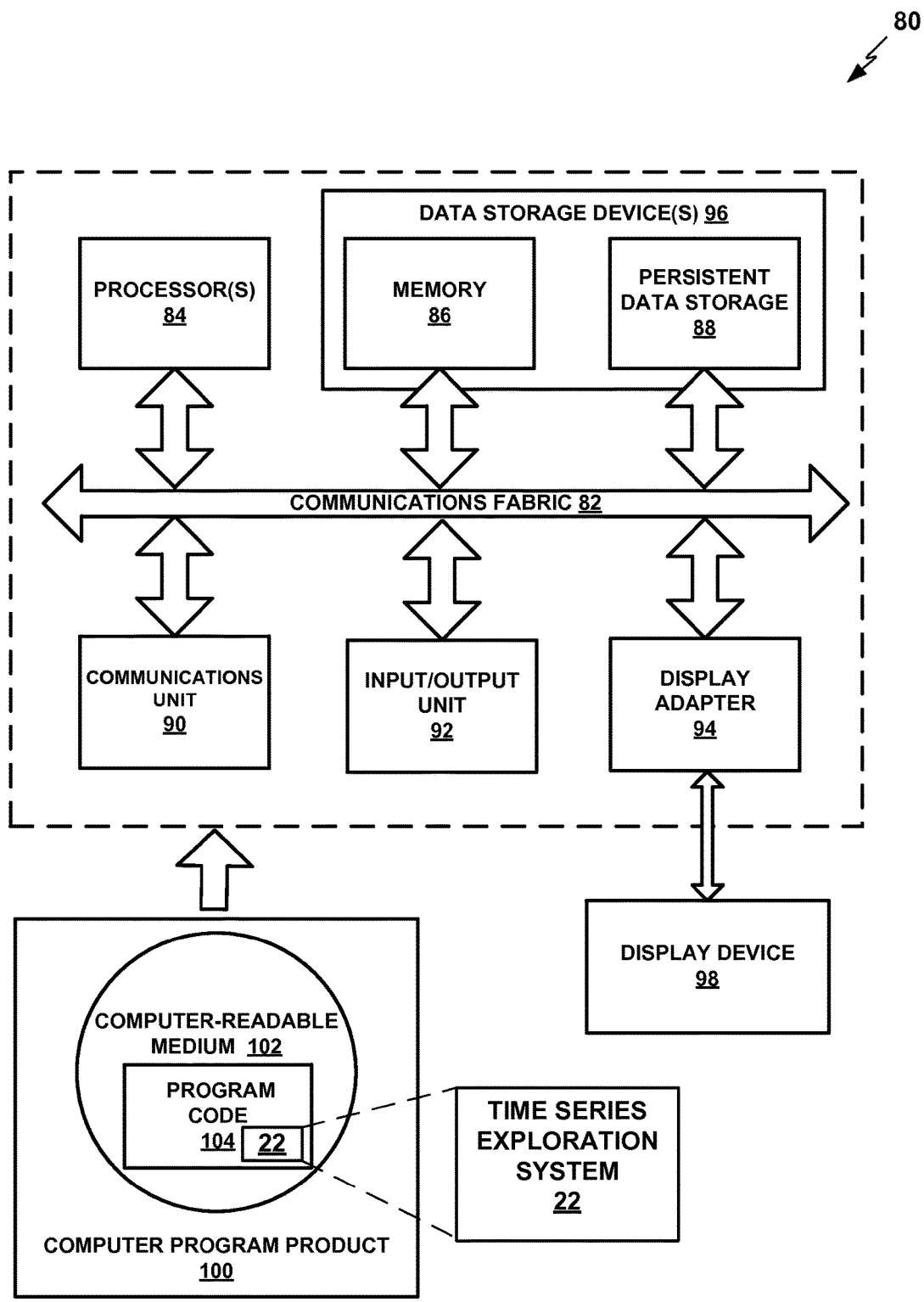
FIG. 11 is a block diagram of a computing device that may be used to implement and execute a time series exploration system, according to an illustrative example.

FIG. 11 is a block diagram of a computing device 80 that may be used to implement and execute a time series exploration system 22, according to an illustrative example.

Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 11, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a time series exploration system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system comprising:
one or more processors, one or more computer-readable memories, and one or more computer-readable tangible storage devices;
program instructions, stored on at least one of the one or more computer-readable tangible storage devices for execution by at least one of the one or more processors via at least one of the one or more computer-readable memories, to retrieve, from one or more databases, a time series of data in response to receiving a request from a client computing device;
program instructions, stored on at least one of the one or more computer-readable tangible storage devices for execution by at least one of the one or more processors via at least one of the one or more computer-readable memories, to decompose the time series of data to extract a trend-cycle component, a seasonal component, and an irregular component from the time series of data;
program instructions, stored on at least one of the one or more computer-readable tangible storage devices for execution by at least one of the one or more processors via at least one of the one or more computer-readable memories, to distribute the trend-cycle component, the seasonal component, and the irregular component of the time series of data into different mappers of a distributed computing system;
program instructions, stored on at least one of the one or more computer-readable tangible storage devices for execution by at least one of the one or more processors via at least one of the one or more computer-readable memories, to perform, by the different mappers of the distributed computing system, and at least partially in parallel, different pattern analyses on the trend-cycle component, the seasonal component, and the irregular component, wherein performing the different pattern analyses comprises:
performing, on the trend-cycle component, at least one of a turning point detection analysis or an overall trend analysis using a time correlation statistic;
performing, on the seasonal component, at least one of a seasonal pattern significance test or an unusual season detection analysis; and performing, on the irregular component, at least one of an outlier detection analysis, a large variance interval detection analysis, or an autocorrelation function analysis;

program instructions, stored on at least one of the one or more computer-readable tangible storage devices for execution by at least one of the one or more processors via at least one of the one or more computer-readable memories, and for each of the different pattern analyses on one of the trend-cycle component, the seasonal component, and the irregular component, to compare a respective analytic result of the respective pattern analysis to a respective significance threshold associated with the respective pattern analysis to determine whether the respective analytic result passes the respective significance threshold;

program instructions, stored on at least one of the one or more computer-readable tangible storage devices for execution by at least one of the one or more processors via at least one of the one or more computer-readable memories, to generate one or more data visualizations that are selected for display, wherein the selected one or more data visualizations include each respective analytic result that passes the respective significance threshold associated with the respective pattern analysis; and program instructions, stored on at least one of the one or more computer-readable tangible storage devices for execution by at least one of the one or more processors via at least one of the one or more computer-readable memories, to output, for display at the client computing device, the one or more data visualizations, wherein outputting the one or more data visualizations includes outputting at least one data visualization that includes the respective analytic result of the irregular component displayed in relation to a combined display of the respective analytic results of both the trend-cycle and seasonal components within the at least one visualization.

2. The computer system of claim 1,
wherein the program instructions to compare the respective analytic result of the respective pattern analysis to the respective significance threshold associated with the respective pattern analysis comprise program instructions to compare a result of the time correlation statistic to a selected time correlation significance threshold, and program instructions to compare a result of the turning point detection analysis to a selected turning point significance threshold.

3. The computer system of claim 1,
wherein the program instructions to compare the respective analytic result of the respective pattern analysis to the respective significance threshold associated with the respective pattern analysis comprise program instructions to compare a result of a p-value of the seasonal pattern significance test to an alpha significance threshold.

4. The computer system of claim 1,
wherein the program instructions to perform the seasonal pattern significance test on the seasonal component comprise program instructions to determine an effect size value to indicate a strength of the seasonal component, and
wherein the program instructions to compare the respective analytic result of the respective pattern analysis to the respective significance threshold associated with the respective pattern analysis comprise program instructions to compare a result of the effect size value to one or more selected effect size significance thresholds.

5. The computer system of claim 1,
wherein the program instructions to compare the respective analytic result of the respective pattern analysis to the respective significance threshold associated with the respective pattern analysis comprise program instructions to compare a result of z-scores of seasons to a selected positive or negative z-score significance threshold.

6. The computer system of claim 1,
wherein the program instructions to compare the respective analytic result of the respective pattern analysis to the respective significance threshold associated with the respective pattern analysis comprise at least one of program instructions to compare a result of z-score values from the outlier detection analysis to a selected z-score significance threshold, program instructions to compare a p-value of a large variance interval test statistic from the large variance interval detection analysis to a selected alpha significance threshold, or program instructions to compare a result of the autocorrelation function analysis to a selected confidence level significance threshold.

7. A computer program product comprising a computer-readable storage medium having program instructions embodied therewith, the program instructions executable by one or more processors to:

responsive to receiving a request from a client computing device, retrieve, from one or more databases, a time series of data;

decompose the time series of data to extract a trend-cycle component, a seasonal component, and an irregular component from the time series of data;

distribute the trend-cycle component, the seasonal component, and the irregular component of the time series of data into different mappers of the distributed computing system;

perform, by the different mappers of the distributed computing system, and at least partially in parallel, different pattern analyses on the trend-cycle component, the seasonal component, and the irregular component, wherein performing the different pattern analyses comprises:

performing, on the trend-cycle component, at least one of a turning point detection analysis or an overall trend analysis using a time correlation statistic;

performing, on the seasonal component, at least one of a seasonal pattern significance test or an unusual season detection analysis; and performing, on the irregular component, at least one of an outlier detection analysis, a large variance interval detection analysis, or an autocorrelation function analysis;

for each of the different pattern analyses on the trend-cycle component, the seasonal component, and the irregular component, compare a respective analytic result of the respective pattern analysis to a respective significance threshold associated with the respective pattern analysis to determine whether the respective analytic result passes the respective significance threshold;

generate one or more data visualizations that are selected for display, wherein the selected one or more data visualizations include each respective analytic result that passes the respective significance threshold associated with the respective pattern analysis; and output, for display at the client computing device, the one or more data visualizations, wherein outputting the one or more data visualizations includes outputting at least one data visualization that includes the respective analytic result of the irregular component displayed in relation to a combined display of the respective analytic results of both the trend-cycle and seasonal components within the at least one visualization.

8. The computer program product of claim 7, wherein the program instructions to compare the respective analytic result of the respective pattern analysis to the respective significance threshold associated with the respective pattern analysis comprise program instructions to compare a result of the time correlation statistic to a selected time correlation significance threshold, and program instructions to compare a result of the turning point detection analysis to a selected turning point significance threshold.

9. The computer program product of claim 7, wherein the program instructions to perform the seasonal pattern significance test on the seasonal component comprise program instructions to determine an effect size value to indicate a strength of the seasonal component, and wherein the program instructions to perform the comparison of the analytic result of the respective pattern analysis to the respective significance threshold associated with the respective pattern analysis comprise program instructions to compare a result of a p-value of the seasonal pattern significance test to an alpha significance threshold, program instructions to compare a result of the effect size value to one or more selected effect size significance thresholds, and program instructions to compare a result of z-scores of seasons to a selected positive or negative z-score significance threshold.

10. The computer program product of claim 7, wherein the program instructions to perform the comparison of the analytic result of the respective pattern analysis to the respective significance threshold associated with the respective pattern analysis comprise at least one of program instructions to compare a result of z-score values from the outlier detection analysis to a selected z-score significance threshold, program instructions to compare a p-value of a large variance interval test statistic from the large variance interval detection analysis to a selected alpha significance threshold, or program instructions to compare a result of the autocorrelation function analysis to a selected confidence level significance threshold.

* * * * *